United States Patent [19]
Frostrom et al.

[11] Patent Number: 5,465,393
[45] Date of Patent: Nov. 7, 1995

[54] SIMULATED AIR INTERFACE SYSTEM FOR SIMULATING RADIO COMMUNICATION

[75] Inventors: Tore Frostrom, Stockholm; Tomas J. Nilsson, Huddinge; Yngve Andersson, Haninge; Michael M. J. Carlsson; Lars-Olof Sundell, both of Stockholm; Jonas P. Uden, Gothenburg, all of Sweden

[73] Assignee: Telefonaktiebolaget LM Ericsson, Stockholm, Sweden

[21] Appl. No.: 45,102

[22] Filed: Apr. 12, 1993

[51] Int. Cl.⁶ .................................. H04B 17/00
[52] U.S. Cl. .................. 455/54.1; 455/33.1; 455/67.3; 455/67.6; 333/109; 333/141
[58] Field of Search .................. 455/33.1, 52.1, 455/52.3, 54.1, 55.1, 67.1, 67.4, 67.6, 67.7, 65, 67.2, 67.3, 67.5; 333/109, 141

[56] References Cited

U.S. PATENT DOCUMENTS

| | | |
|---|---|---|
| 3,988,678 | 10/1976 | Hodge. |
| 4,140,973 | 2/1979 | Stevens. |
| 4,910,794 | 3/1990 | Mahany. |
| 4,952,193 | 8/1990 | Talwar .................................... 455/67.6 |
| 4,977,399 | 12/1990 | Price et al.. |
| 4,996,695 | 2/1991 | Dack et al.. |
| 5,191,594 | 3/1993 | Argo et al. ............................. 455/52.3 |

OTHER PUBLICATIONS

Bussgang, J., Goldberg, B. and Getchell, E., "Simulation and Probing of Radio Channels", Jan. 1974, pp. 17–24.

Primary Examiner—Edward F. Urban
Assistant Examiner—Doris To
Attorney, Agent, or Firm—Burns, Doane, Swecker & Mathis

[57] ABSTRACT

A simulated air interface system repeatedly simulates a constant but variable open air environment. In the system, a plurality of mobile stations are connected to at least one base station by cables. The system separates the radio path at each mobile station's antenna into an uplink path and a downlink path so that frequency modulation and signal reflections are not introduced into the system. The conditions of the simulated open air environment can be varied by introducing attenuation, doppler shifts, and signal fading into the system.

11 Claims, 8 Drawing Sheets

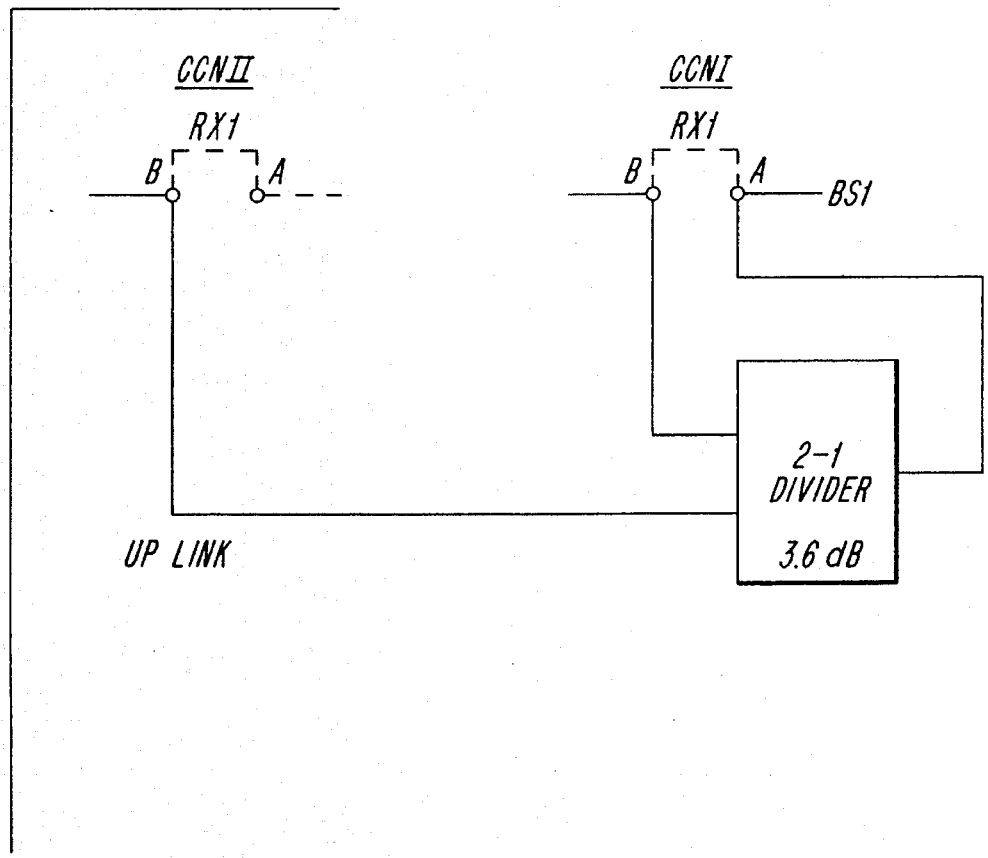
*FIG. 6*
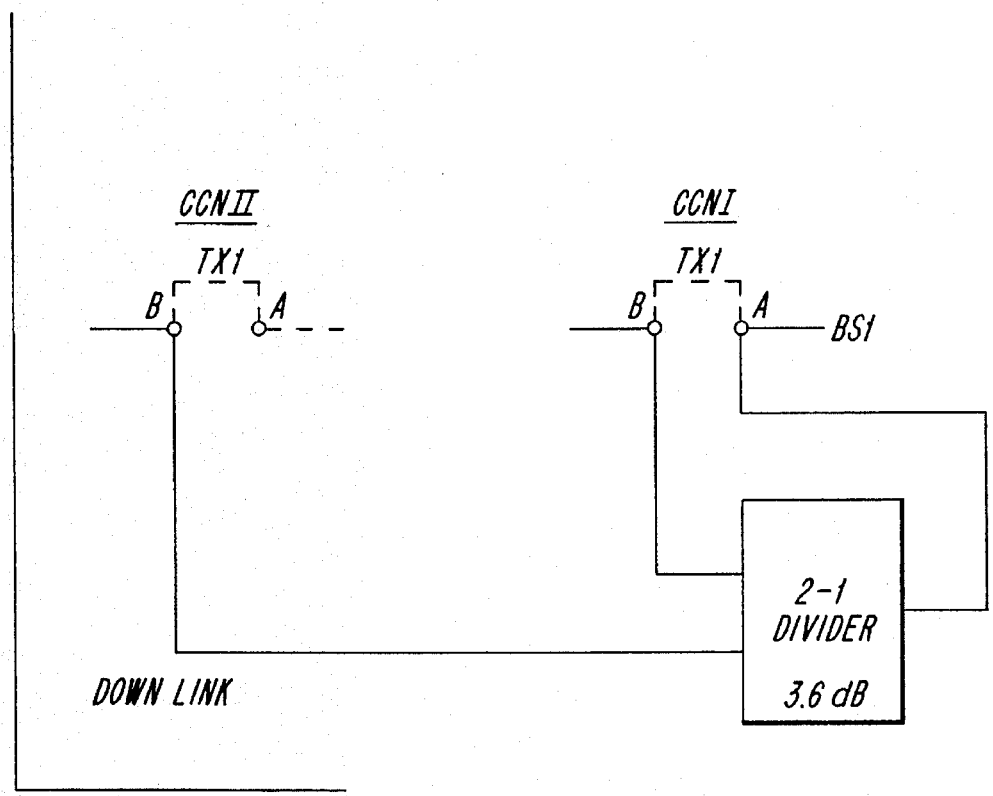

SIMULATED AIR INTERFACE SYSTEM FOR SIMULATING RADIO COMMUNICATION

FIELD OF THE INVENTION

The present invention relates to an air interface model for simulating an open air environment and more particularly to an air interface model which can set a plurality of operating conditions to allow repeated tests on a radio path between base stations and mobile stations.

BACKGROUND OF THE INVENTION

A typical radio communication system includes a plurality of multiple switching centers, a plurality of base stations, and a plurality of mobile stations. The multiple switching centers connect the radio communication system to the public switched telephone network. The base stations are connected to the multiple switching centers by in ground cables or by wireless techniques such as Ericsson Mini Link, a registered trademark of Ericsson. Each base station controls the radio communications within certain areas which are called cells. A mobile station operating in a particular cell communicates with the base station for that particular cell through open air transmissions.

When a new cellular system is being set up or during maintenance of an existing system, it may be necessary to perform repeated tests on the system since potential faults or problems may not be detected by a single test. In addition, the reliability of the system and the controlling software can also be verified by using repeat testing. In particular, it may be necessary to perform repeated tests on the radio path between base stations and mobile stations. Several methods for testing the radio paths between radio base stations and mobile stations have been suggested. In particular, methods have been suggested in which tests are performed in the actual site environments and also methods that simulate a cellular system.

The prior test methods which conduct measurements in the actual site environment use actual base stations and actual mobile stations during the test which communicate using open air transmissions. For example, the tests can be performed on the radio paths between a base station and several mobile stations which are placed at various locations in the radio communication system. Tests are then run on the radio path between the individual mobile stations and the base stations and the results of the tests are recorded at the base stations and the mobile stations. However, it is hard to compare the results obtained from repeated tests since the testing conditions in these open air environment systems are always changing. In these open air environment systems, weather changes, interfering signals, rayleigh fading conditions all vary with time and therefore it is difficult to conduct repeated testing since the testing conditions are always changing.

Other existing radio environment networks which simulates open air environment systems are well known in the art. In these systems a base station and a mobile station are connected by a cable through which they communicate with each other. These networks use the same radio path for sending signals between the base stations and the mobile stations. While such systems do not have the problems that are associated with the open air environment systems, i.e., conditions which vary during the repeated tests, these systems have several disadvantages. For instance, since these systems use the same radio path for sending signals back and forth between the base stations and the mobile stations, frequency intermodulation and signal reflections are introduced into the system.

Therefore there is a need for a system which simulates a cellular system wherein repeated tests can be performed under constant testing conditions without introducing frequency modulation and signal reflections into the tested system.

SUMMARY OF THE DISCLOSURE

It is an object of the present invention to overcome the above-mentioned problems by using an air interface model which simulates an open air environment and separates the radio path at the mobile station's antenna into an up-link path and down-link path.

In one embodiment of the present invention, a coaxial network air interface is disclosed for simulating radio communication between at least one mobile station and at least one base station. The coaxial network air interface is comprised of directional couplers for splitting a radio path between a mobile station and a base station into an up-link path and a down-link path. The coaxial network air interface also includes a plurality of dividers for dividing the up-link and down-link paths into a plurality of paths and a combining means for combining a plurality of received signals. The coaxial network air interface also includes means for generating different traffic conditions in the radio path wherein the generating means is located between the dividers and the combining means.

In another embodiment of the present invention, the coaxial network air interface also includes a computerized automatic control means for controlling the operation of the generating means.

In another embodiment of the present invention, a method for simulating radio communications between at least one mobile station and at least one base station in a mobile radio communication system is disclosed. First, a radio path between a mobile station and a base station is split into an up-link path and a down-link path. The up-link and down-link paths are further divided into a plurality of paths. Different traffic conditions are then generated and introduced into the plurality of paths which are then combined.

BRIEF DESCRIPTION OF THE DRAWINGS

The present invention will now be described in more detail with reference to the preferred embodiments of the invention and given only by way of example, and illustrated in the accompanying drawings in which:

FIG. 6 illustrates an 8-mobile, 1-base station embodiment of the present invention.

DETAILED DESCRIPTION OF THE PREFERRED EMBODIMENTS

While the following description is in the context of cellular communication systems involving portable or mobile radio telephones and/or personal communication networks, it will be understood by those skilled in the art that the present invention may be applied to other mobile communications applications.

Figure 1:
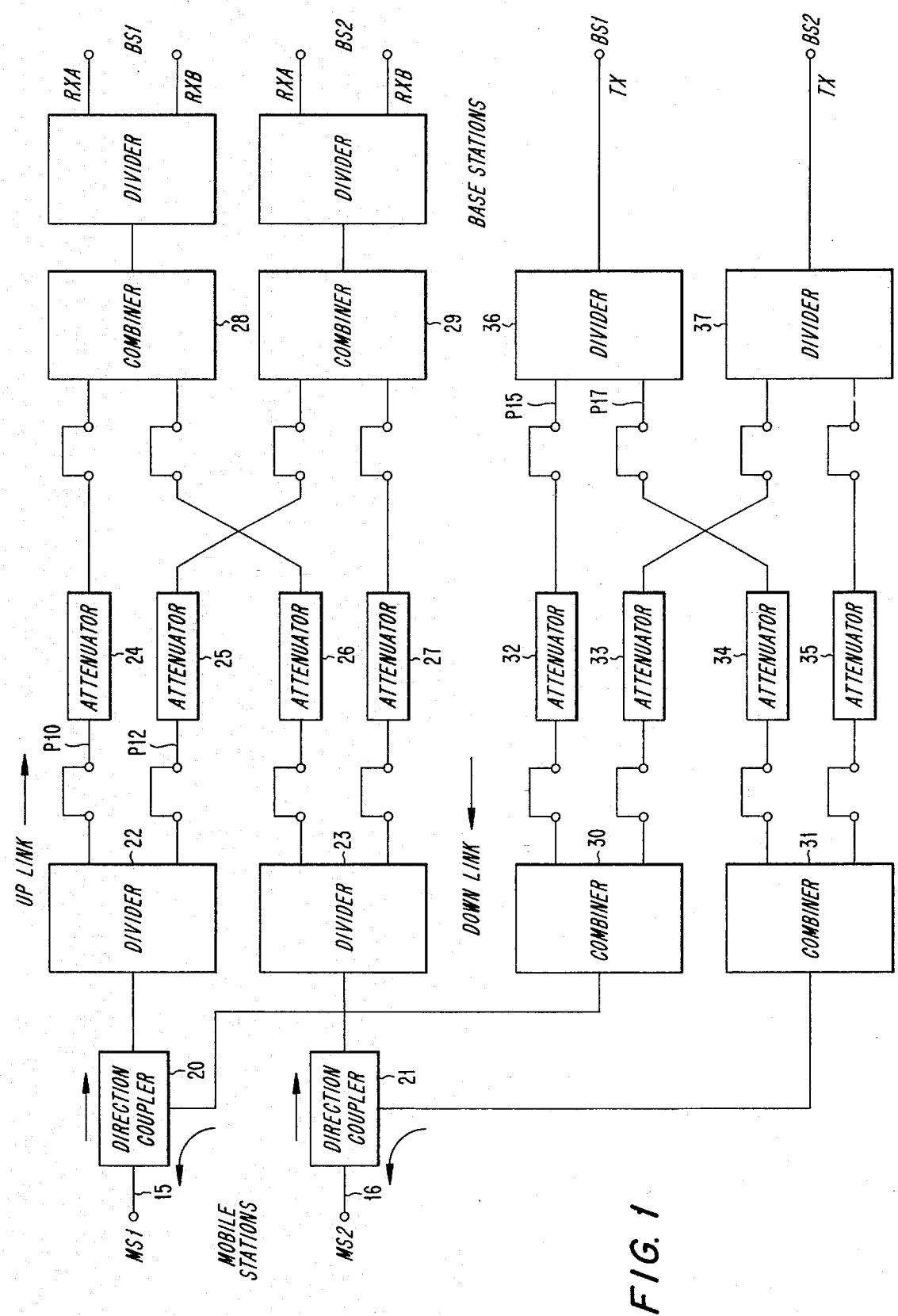
FIG. 1 illustrates a block diagram of one embodiment of the present invention, in which 2 mobile stations are connected to 2 base stations.

Referring now to FIG. 1, FIG. 1 illustrates one embodiment of the present invention. In this embodiment, a cellular radio system contains two mobile stations and two base stations. In the following description, the focus will be mainly on mobile station 1. However, one of ordinary skill in the art will realize that the same discussion holds for mobile station 2. In the present invention, the mobile stations and the base stations are connected together by coaxial conductors. The mobile station MS1 is connected to a direction coupler 20 by a coaxial conductor 15. The directional coupler splits the radio path from the mobile station into an up-link path and a down-link path. The up-link path is used for communications from the mobile station and the base station and the down-link path is used for communications from the base station to the mobile station. The up-link path enters a divider 22 which divides the up-link path into a plurality of paths wherein the plurality of paths is equal to or greater than the number of base stations. In this example, the divider 22 divides the up-link path into two paths, one path leading directly to a first base station BS1 while the other path leads to a second base station BS2. As a result, the present invention can simulate handover between two base stations.

The first path P10 is attenuated by attenuator 24 while the path P12 is attenuated by the attenuator 25. The path P10 is then combined in a combiner 28 with a signal path from the second mobile station while the path P12 is combined in combiner 29 with a second path from the second mobile station. The output of the combiner is then divided to form a diversity input at the base stations receiving inputs completing the up-link path.

In a similar way, the down-link path runs from the base stations to the mobile stations. A signal from the first base station BS1 is received at a divider 36 which is divided into two signal paths P15 and P17. The signal path P15 is then attenuated in attenuator 32, while path P17 is attenuated in attenuator 34. The signal path P15 is then combined in combiner 30 with a signal path from the second base station while the signal path P17 is combined in combiner 31 with a second signal path from the base station BS2. The combiner 30 is connected to the direction coupler 20 which directs the signal to the first mobile station MS1. Likewise, the combiner 31 is connected to directional coupler 21 which directs the signals to the second mobile station MS2.

The apparatus illustrated in FIG. 1 can therefore be used to test the effects of attenuation on signals between mobile stations and base stations by varying the attenuation in attenuators 24 and 25. Since the environment is a closed environment, signals will not be influenced by unwanted factors such as interference, weather conditions, etc., and automatic repetitions of tests can be conducted on the cellular system.

Figure 2A:
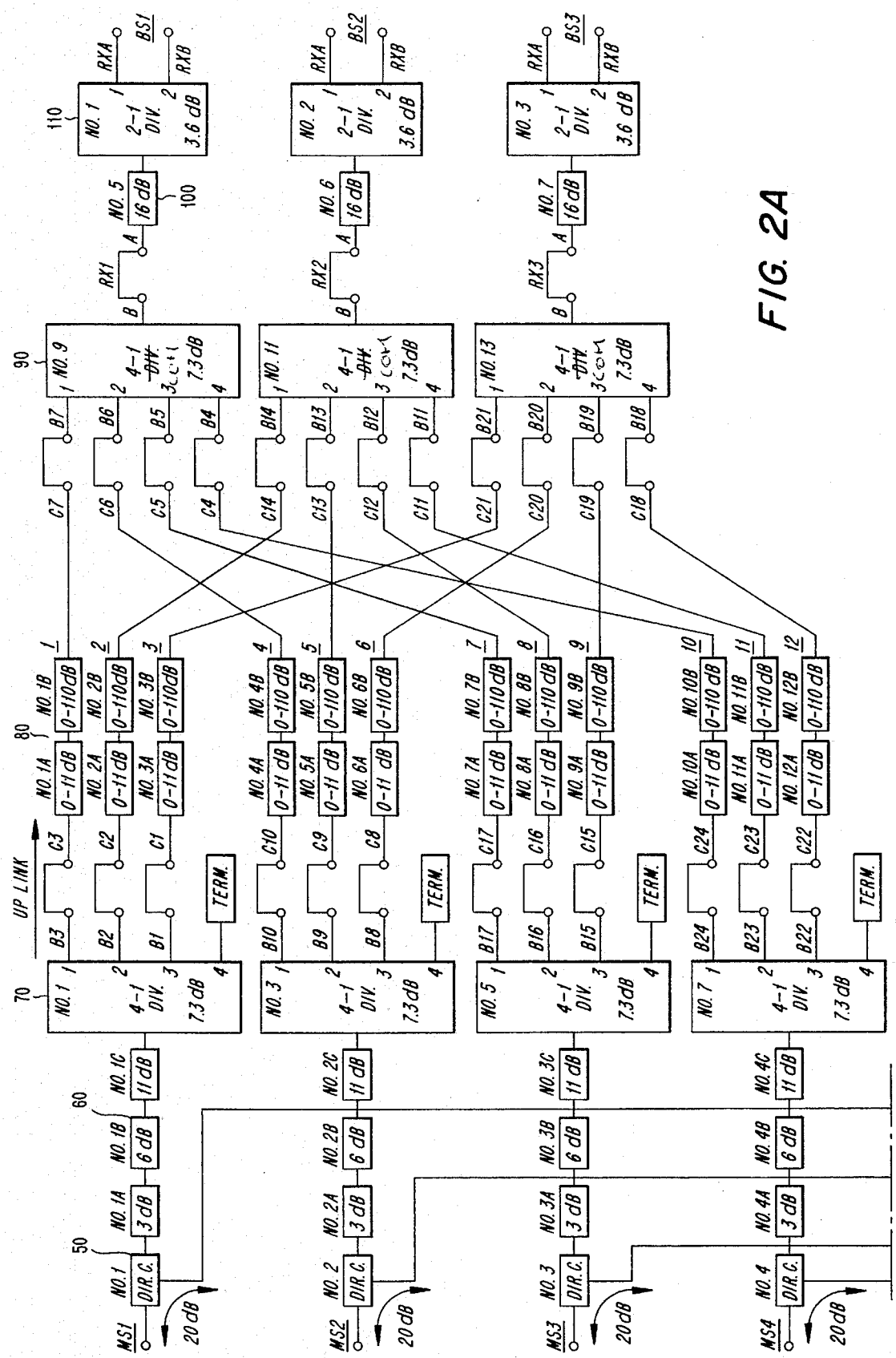
FIGS. 2A–2B illustrate another embodiment of the present invention, in which 4 mobile stations are connected to 3 base stations.
Figure 2B:
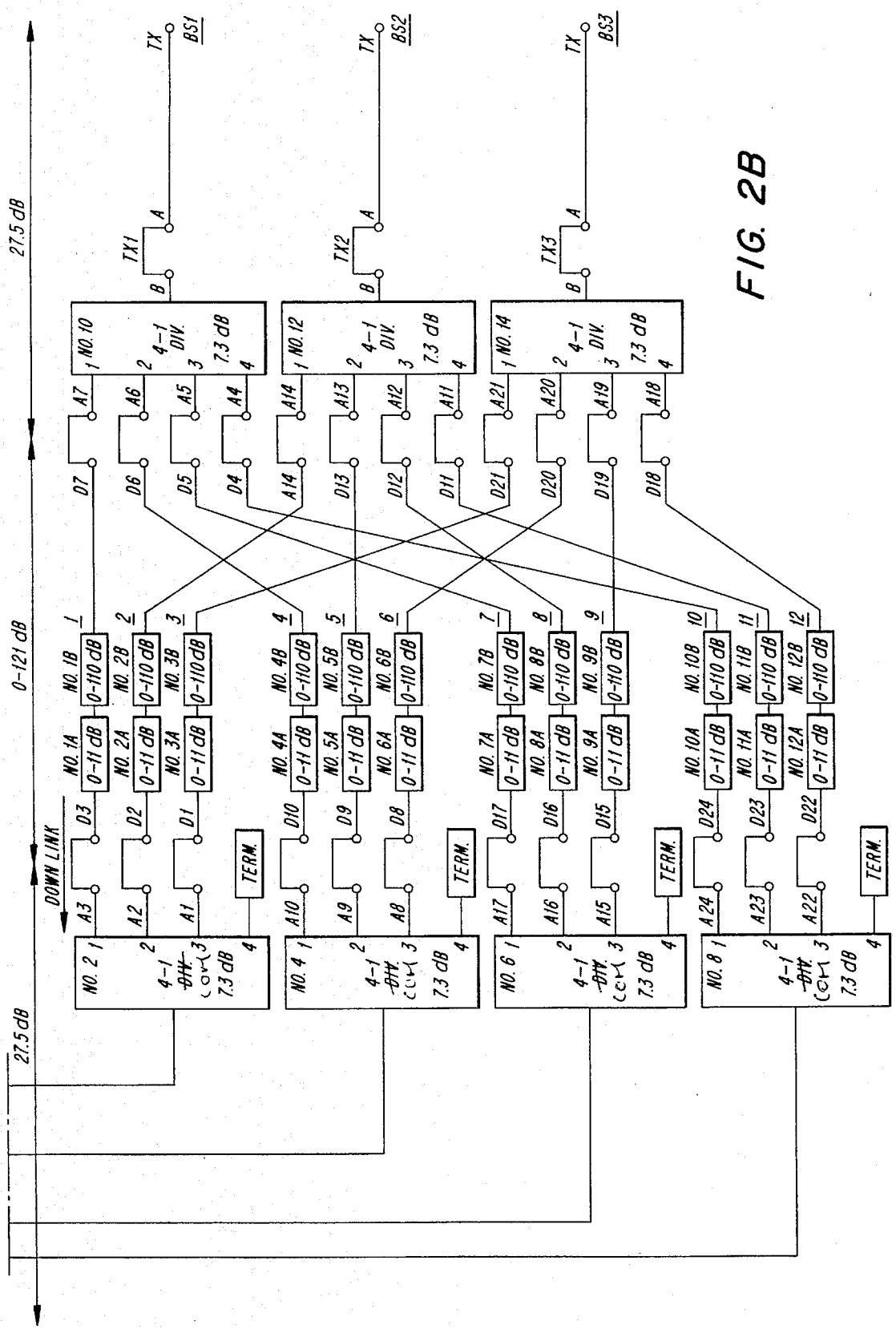

FIGS. 2A–2B illustrate an air interface with four mobile stations and three base stations in one embodiment of the present invention. In this example, each mobile station is connected to an individual directional coupler 50. Each directional coupler 50 divides the radio path going to and from the mobile station into an up-link path and a down-link path. Referring now to the up-link path, the signal from the mobile station is attenuated in attenuator 60 and applied to a divider 70. The divider 70 splits the signal into four different paths. For example, the up-link signal from mobile station MS1 is divided in divider 70 into four paths B0–B3. Since there are only three base stations, the path B0 is terminated. The paths B1–B3 are then attenuated in variable attenuators 80. The three paths B1–B3 are then sent to different combiners 90. Each of the four mobile stations has an up-link path connected to each of the combiners 90. As a result, each combiner 90 has four signals being input into the combiner from four different mobile stations. The output of the combiner 90 is then attenuated in attenuator 100 and sent to each base station via a divider 110 to form a diversity input, respectively. The attenuator 100 compensates the attenuation in the uplink path so that it is the same as the attenuation in the downlink path. In addition, the attenuator 100 can set the range for the receiver of the base station.

On the down-link path, each base station transmits a signal to one of a plurality of dividers 120. The dividers 120 divide the signal into four paths, one signal for each mobile station. The signals are then attenuated in variable attenuators 130 and are then sent to combiners 140. Each combiner 140 receives signals for only one particular mobile station. The output of the combiner 140 is then sent to the directional coupler 50 for the respective mobile station.

The variable attenuators 80 and 130 can be replaced by other devices to introduce time delay simulating time dispersion, fading, doppler effect, etc., while also including the attenuation possibilities. For example, a RF channel simulator can be used to simulate delay, doppler shift, and fading.

Figure 3A:
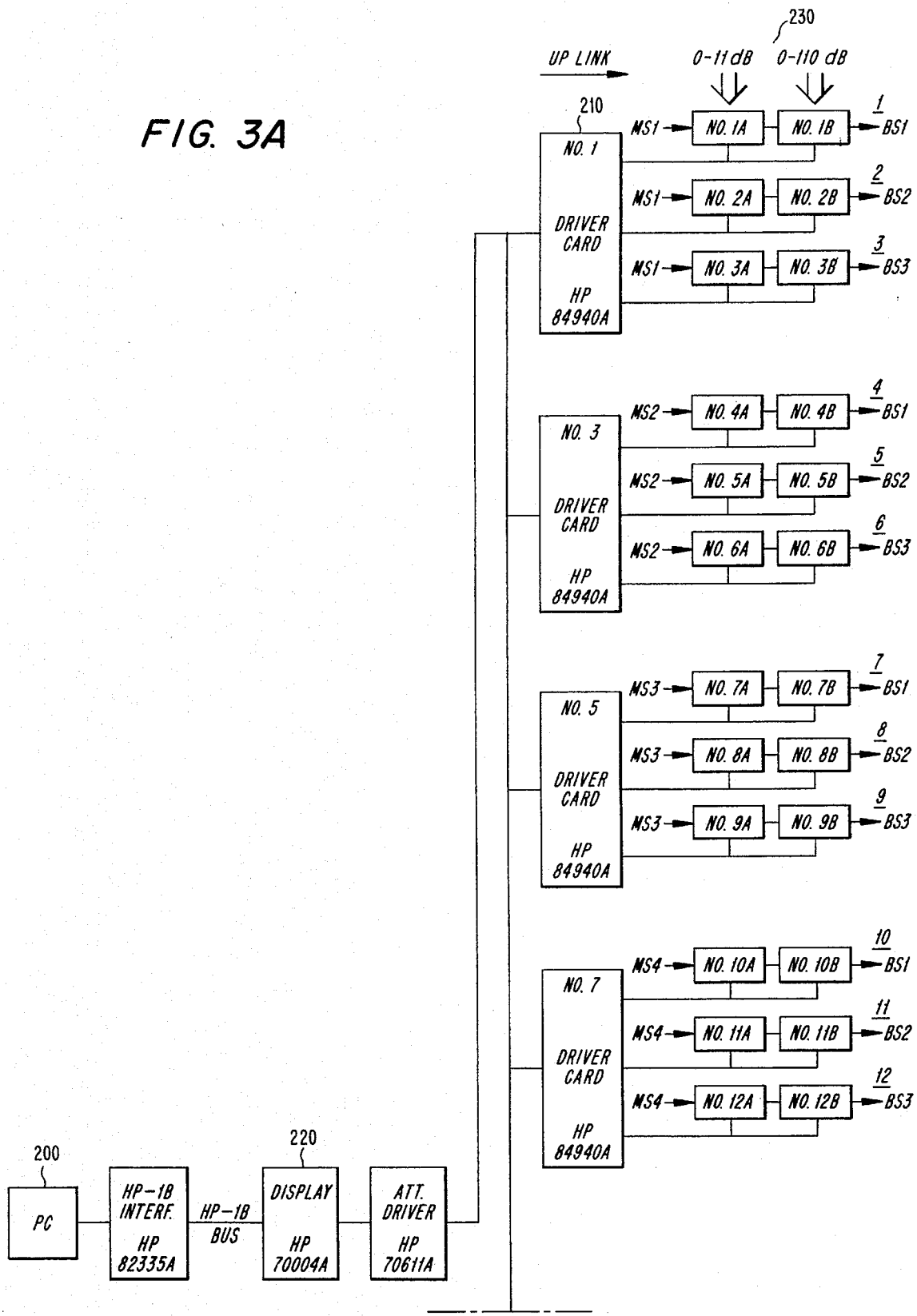
FIGS. 3A–3B illustrate a personal computer and a plurality of driving cards which generate different traffic conditions.
Figure 3B:
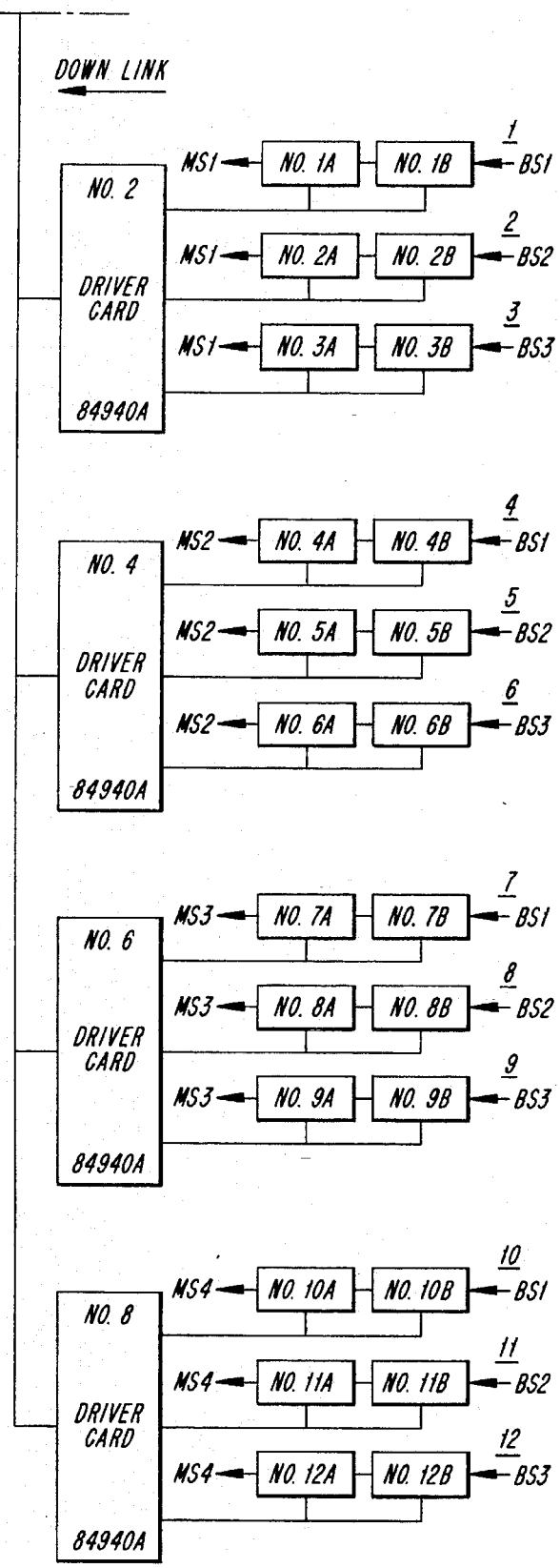

FIGS. 3A–3B illustrate a personal computer 200 and a plurality of driver cards 210 that generate different traffic conditions by controlling the variable attenuators. This control arrangement is connected to the device illustrated in FIGS. 2A–2B according to the encircled numbers in FIGS. 2A–2B and 3A–3B, respectively. The personal computer can display cell patterns with a plurality of mobile stations. By moving the mobile stations around the cell patterns, the user is able to induce and visually follow certain simulated mobile traffic conditions. For example, the personal computer and the driver cards can adjust the variable attenuators to change the amount of attenuation in the signals between the mobile stations and the base stations or vice versa.

Figure 4:
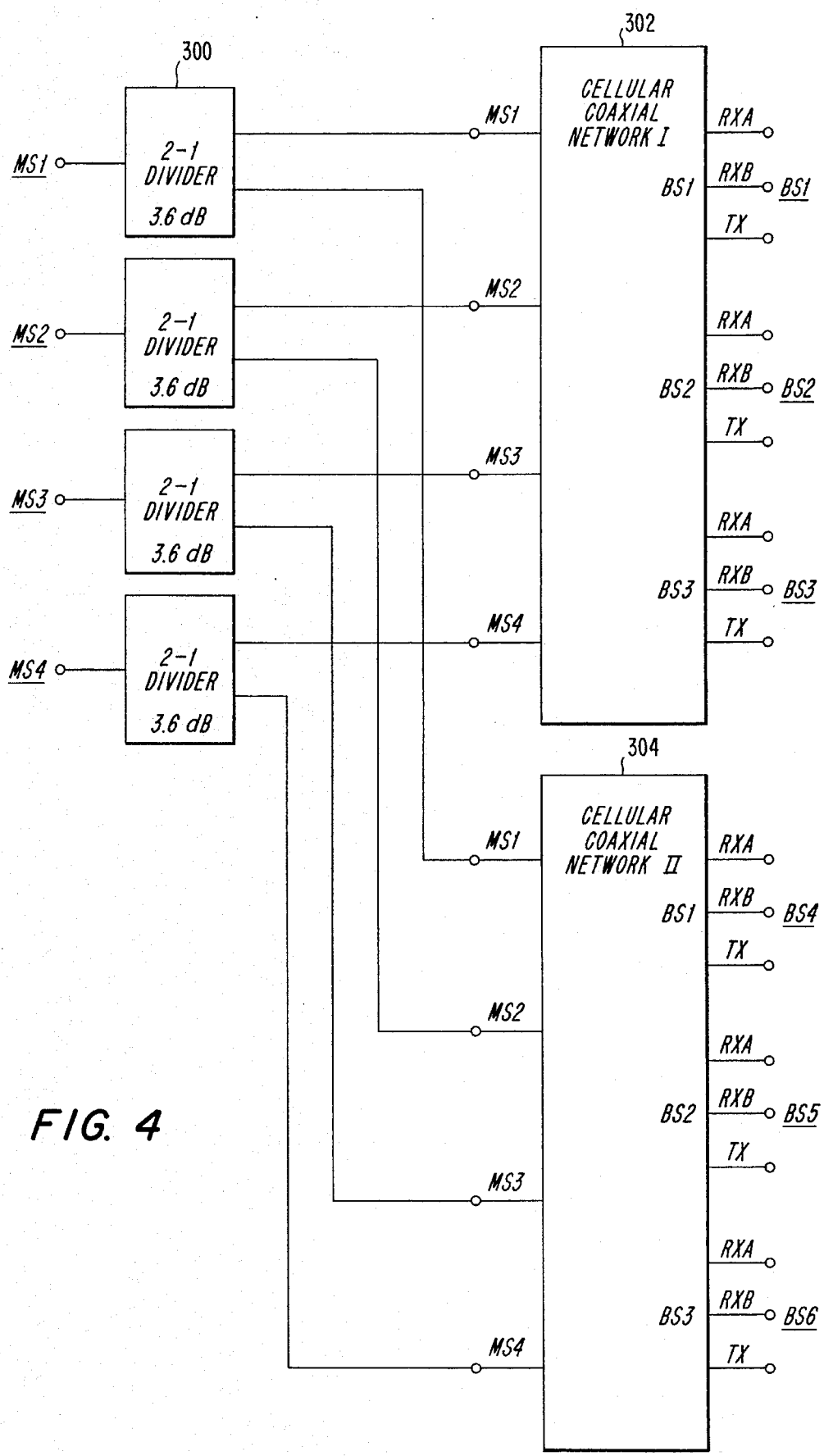
FIG. 4 illustrates a 4-mobile, 6-base station embodiment of the present invention.
Figure 5:
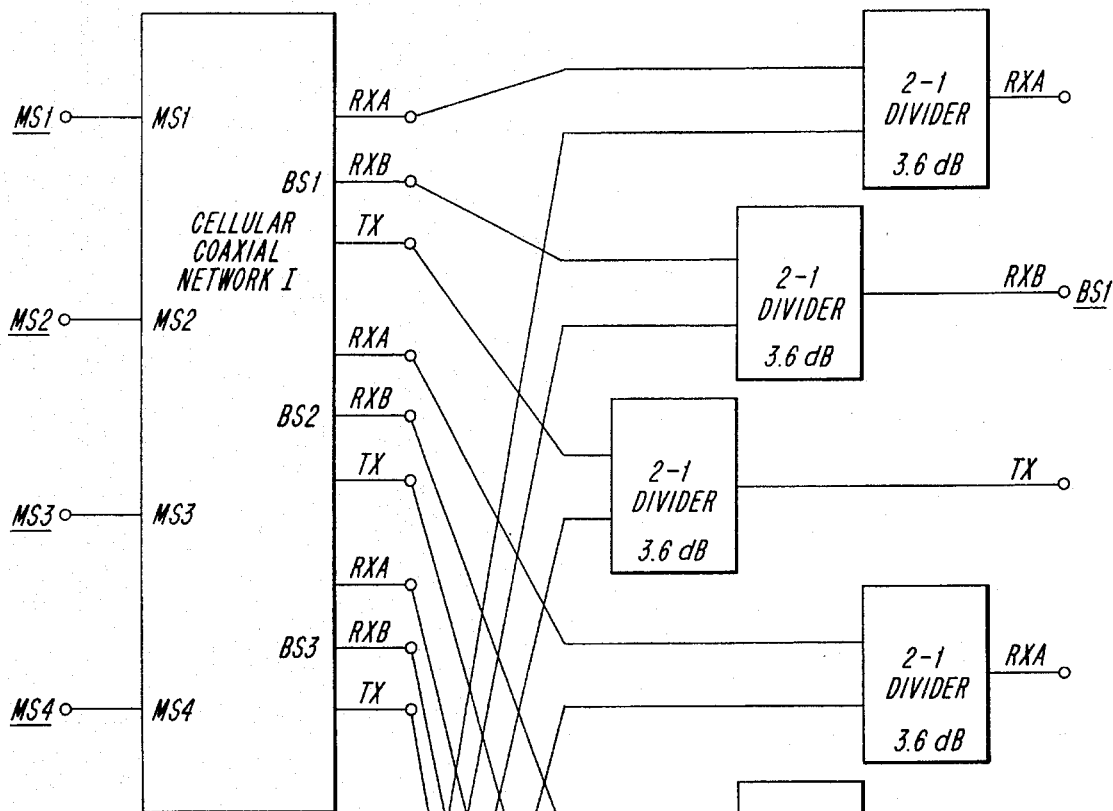
FIG. 5 illustrates an 8-mobile, 3-base station embodiment of the present invention.
Figure 5:
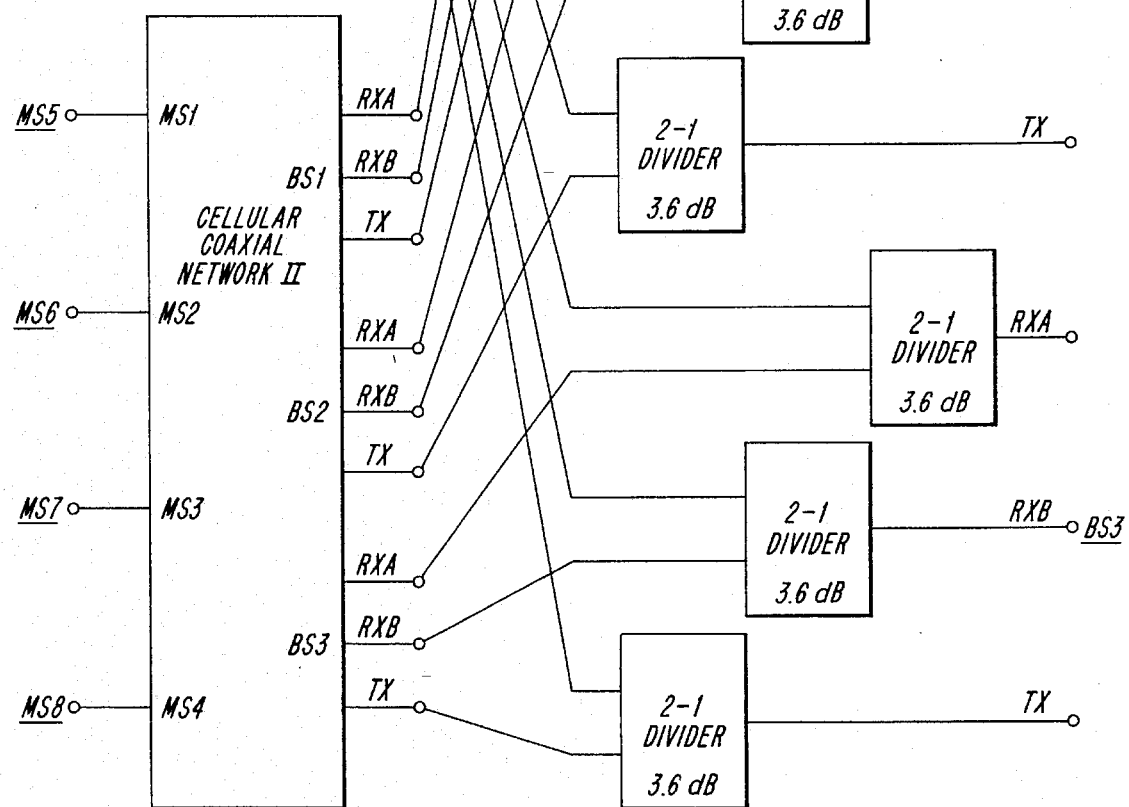

FIGS. 4–6 illustrate several extended cellular coaxial networks containing four mobile stations and six base stations, eight mobile stations and three base stations, and eight mobile stations and one base station, respectively. In FIG. 4, a system can be constructed with four mobile stations and six base stations by inputting the signal from the mobile stations MS1–MS4 to a plurality of two-to-one dividers 300 and sending each of the resulting signal paths to two separate cellular coaxial networks 302 and 304, respectively. In this embodiment, each of the cellular coaxial networks 302 and 304 contains the circuitry explained above with regard to FIGS. 2A–2B. In addition, each cellular coaxial network is connected to a plurality of base stations BS1–BS6.

FIG. 5 illustrates how two cellular coaxial networks can be used to connect eight mobile stations MS1–MS8 to three base stations BS1–BS3. FIG. 6 illustrates how two cellular coaxial networks CCNII and CCNI can be combined to connect eight mobile stations to one base station BS1. It will be obvious to one of ordinary skill in the art that endless combinations of base stations and mobile stations can be connected together by using a plurality of cellular coaxial networks.

The present invention is not limited by the given examples. As mentioned above, the cellular coaxial network enables tests such as paging, calls to mobiles, calls from mobiles, handover, fading, time dispersion and doppler generating to be performed. The system can be used in either digital or analog systems. Furthermore, features of the present invention may also be implemented in areas other than mobile communication, i.e., where an air interface with mobile radio stations is required.

While a particular embodiment of the present invention has been described and illustrated it should be understood that the invention is not limited thereto since modifications may be made by persons skilled in the art. The present application contemplates any and all modifications that fall within the spirit and scope of the underlying invention disclosed and claimed herein.

What is claimed is:

1. A coaxial network air interface for simulating radio communication between a plurality of mobile stations and a plurality of base stations on a plurality of radio paths comprising:

a directional coupler for each mobile station for splitting a radio path between each mobile station and each base station into an up-link path and down-link path, said each up-link path comprising:

a divider for dividing said up-link path into a first plurality of paths;

means for generating selective traffic conditions on signals in said first plurality of paths, said means being located on said first plurality of paths between said divider and a combining means; and said combining means for combining a third plurality of paths, wherein each combining means receives one up-link path from said each mobile station, and said combining means is connected to a base station;

said each down-link path comprising:

a second divider for dividing said down-link path from said each base station into a second plurality of paths;

means for generating selective traffic conditions on signals in said second plurality of paths, said means being located on said second plurality of paths between said second divider and a second combining means; and said second combining means for combining a fourth plurality of paths, wherein each second combining means receives one down-link path from said each base station, and said second combining means is connected to the directional coupler of the down-link path.

2. A coaxial network air interface according to claim 1, wherein said up-link and down-link paths are coaxial conductors.

3. A coaxial network air interface according to claim 1, wherein said means for generating selective traffic conditions located on both the up-link and down-link paths are attenuators.

4. A coaxial network air interface according to claim 1, wherein said means for generating selective traffic conditions located on both the up-link and down-link paths are variable attenuators.

5. A coaxial network air interface according to claim 1, wherein said means for generating selective traffic conditions located on both the up-link and down-link paths are signal delay means.

6. A coaxial network air interface according to claim 1, wherein said means for generating selective traffic conditions located on both the up-link and down-link paths introduce signal fading into the simulated radio communication.

7. A coaxial network air interface according to claim 1, wherein said means for generating selective traffic conditions located on both the up-link and down-link paths introduce doppler shifts into the simulated radio communication.

8. A coaxial network air interface according to claim 1, further comprising:

computerized automatic control means for controlling the operation of all of said generating means.

9. A coaxial network air interface according to claim 8, wherein said computerized automatic control means simulates movable mobile stations on a screen with a cell pattern of a mobile radio communication system.

10. A coaxial network air interface according to claim 1, wherein said first plurality of paths is equal to a number of base stations.

11. A coaxial network air interface according to claim 1, wherein said second plurality of paths is equal to a number of mobile stations.

* * * * *